United States Patent
Tucker et al.

(10) Patent No.: US 12,109,938 B2
(45) Date of Patent: Oct. 8, 2024

(54) SYSTEM FOR COMMUNICATION OF HAZARDOUS VEHICLE AND ROAD CONDITIONS

(71) Applicant: ESS-HELP, INC., Houston, TX (US)

(72) Inventors: David M. Tucker, Katy, TX (US); Stephen T. Powers, Houston, TX (US); Mike Incorvaia, Hendersonville, TN (US); Austin Reece Tucker, Katy, TX (US)

(73) Assignee: ESS-Help, Inc., Houston, TX (US)

( * ) Notice: Subject to any disclaimer, the term of this patent is extended or adjusted under 35 U.S.C. 154(b) by 150 days.

(21) Appl. No.: 16/991,595

(22) Filed: Aug. 12, 2020

(65) Prior Publication Data

US 2021/0049909 A1    Feb. 18, 2021

Related U.S. Application Data

(60) Provisional application No. 62/885,659, filed on Aug. 12, 2019.

(51) Int. Cl.
*B60Q 1/50* (2006.01)
*B60K 35/00* (2024.01)
(Continued)

(52) U.S. Cl.
CPC .............. *B60Q 1/525* (2013.01); *B60K 35/00* (2013.01); *B60Q 1/46* (2013.01); *B60Q 9/008* (2013.01);
(Continued)

(58) Field of Classification Search
CPC ........ G08G 1/162; G08G 1/22; G08G 1/0962; G08G 1/096791; B60K 35/00;
(Continued)

(56) References Cited

U.S. PATENT DOCUMENTS

| | | |
|---|---|---|
| 3,553,644 A | 1/1971 | Elmer |
| 4,176,340 A | 11/1979 | Steinmeier |

(Continued)

FOREIGN PATENT DOCUMENTS

| | | |
|---|---|---|
| BG | 66564 B1 | 3/2017 |
| CN | 203273673 U | 11/2013 |

(Continued)

OTHER PUBLICATIONS

Chris Davies, "Inside Cadillac's early bet on Vehicle-to-Vehicle tech", "Inside Cadillac's early bet on Vehicle-to-Vehicle tech", Mar. 10, 2017, Publisher: https://www.slashgear.com/inside-cadillacs-early-bet-on-v2v-vehicle-to-vehicle-tech-10478130/.

(Continued)

*Primary Examiner* — Maceeh Anwari
(74) *Attorney, Agent, or Firm* — GabelGotwals; David G. Woodral

(57) ABSTRACT

A system for signaling a hazard condition of a vehicle includes a microprocessor configured to receive an electronic signal from the vehicle that is indicative of a hazardous condition involving the vehicle, and a first radio transmitter in operative communication with the microprocessor. In response to receiving the signal indicative of a hazardous event, the microprocessor sends a first wireless signal via the first radio transmitter that indicates the vehicle is involved in the hazardous condition.

8 Claims, 5 Drawing Sheets

(51) Int. Cl.
| | |
|---|---|
| *B60K 35/23* | (2024.01) |
| *B60K 35/28* | (2024.01) |
| *B60Q 1/46* | (2006.01) |
| *B60Q 9/00* | (2006.01) |
| *B60W 30/095* | (2012.01) |
| *B60W 30/16* | (2020.01) |
| *B60W 50/14* | (2020.01) |
| *G01S 19/42* | (2010.01) |
| *G08G 1/00* | (2006.01) |
| *G08G 1/16* | (2006.01) |
| *H04B 1/3822* | (2015.01) |

(52) U.S. Cl.
CPC ........ *B60W 30/0956* (2013.01); *B60W 30/16* (2013.01); *B60W 50/14* (2013.01); *G01S 19/42* (2013.01); *G08G 1/162* (2013.01); *G08G 1/22* (2013.01); *H04B 1/3822* (2013.01); *B60K 35/23* (2024.01); *B60K 35/28* (2024.01); *B60K 2360/178* (2024.01); *B60W 2050/146* (2013.01); *B60W 2420/403* (2013.01); *B60W 2556/65* (2020.02)

(58) Field of Classification Search
CPC ...... B60K 2370/1529; B60K 2370/178; B60K 2370/1868; B60K 2370/193; B60K 2370/21; B60K 2370/5915; B60K 37/00; B60Q 1/30; B60Q 1/46; B60Q 9/008; B60Q 1/525; B60W 30/0956; B60W 30/16; B60W 50/14; B60W 2050/146; B60W 2420/42; B60W 2556/65; B60W 2556/45; B60W 2556/50; G01S 19/42; H04B 1/3822
USPC .......................................................... 701/117
See application file for complete search history.

(56) References Cited

U.S. PATENT DOCUMENTS

| | | |
|---|---|---|
| 4,227,174 A | 10/1980 | Belcher et al. |
| 4,238,778 A | 12/1980 | Ohsumi |
| 4,357,594 A | 11/1982 | Ehrlich et al. |
| 4,550,305 A | 10/1985 | Bookbinder |
| 4,981,363 A | 1/1991 | Lipman |
| 5,043,699 A | 8/1991 | Hayden |
| 5,264,826 A | 11/1993 | Henderson et al. |
| 5,374,920 A | 12/1994 | Evens |
| 5,434,758 A | 7/1995 | Zeidler |
| 5,481,243 A | 1/1996 | Lurie et al. |
| 5,510,763 A | 4/1996 | Deckard et al. |
| 5,515,026 A | 5/1996 | Ewert |
| 5,519,389 A | 5/1996 | DeGunther et al. |
| 5,572,201 A | 11/1996 | Graham et al. |
| 5,646,385 A | 7/1997 | Bogovican et al. |
| 5,736,925 A | 4/1998 | Knauff |
| 5,775,712 A | 7/1998 | Link et al. |
| 5,850,177 A | 12/1998 | Zimmerman |
| 6,023,221 A | 2/2000 | Michelotti |
| 6,025,775 A | 2/2000 | Erlandson |
| 6,028,512 A | 2/2000 | Schropp et al. |
| 6,078,145 A | 6/2000 | Tillinghast et al. |
| 6,081,188 A | 6/2000 | Kutlucinar et al. |
| 6,160,493 A | 12/2000 | Smith |
| 6,181,243 B1 | 1/2001 | Yang |
| 6,229,438 B1 | 5/2001 | Kutlucinar et al. |
| 6,323,766 B1 | 11/2001 | Bartlett et al. |
| 6,351,211 B1 | 2/2002 | Bussard |
| 6,397,133 B1 | 5/2002 | van der Pol et al. |
| 6,420,799 B1 | 7/2002 | Sakamoto et al. |
| 6,445,289 B1 | 9/2002 | Roberts |
| 6,456,206 B1 | 9/2002 | Rocca et al. |
| 6,515,584 B2 | 2/2003 | DeYoung |
| 6,590,507 B2 | 7/2003 | Burns |
| 6,623,151 B2 | 9/2003 | Pederson |
| 6,674,182 B2 | 1/2004 | Maynard et al. |
| 6,744,359 B1 | 6/2004 | Wasilewski et al. |
| 6,842,111 B1 | 1/2005 | Smithson |
| 6,858,986 B2 | 2/2005 | Monk |
| 6,879,251 B2 | 4/2005 | Robbins et al. |
| 6,895,332 B2 | 5/2005 | King et al. |
| 6,922,137 B1 | 7/2005 | Bycroft |
| 7,046,160 B2 | 5/2006 | Pederson et al. |
| 7,113,107 B2 | 9/2006 | Taylor |
| 7,119,672 B2 | 10/2006 | Subbaraman |
| 7,150,554 B2 | 12/2006 | Calderas |
| 7,199,704 B2 | 4/2007 | Herrig et al. |
| 7,404,372 B2 | 7/2008 | Aasgaard |
| 7,455,139 B2 | 11/2008 | Lee |
| 7,679,505 B1 | 3/2010 | Vallaire |
| 7,852,203 B2 | 12/2010 | Herrig et al. |
| 7,961,086 B2 | 6/2011 | Bradley |
| 8,032,273 B2 | 10/2011 | Yang et al. |
| 8,049,610 B2 | 11/2011 | Malik |
| 8,099,113 B2 | 1/2012 | Morrison |
| 8,126,479 B2 | 2/2012 | Morrison |
| 8,126,480 B2 | 2/2012 | Morrison |
| 8,198,991 B2 | 6/2012 | Do |
| 8,223,037 B2 | 7/2012 | Grotendorst et al. |
| 8,275,347 B2 | 9/2012 | Sennett et al. |
| 8,301,112 B2 | 10/2012 | Morrison |
| 8,306,503 B2 | 11/2012 | Morrison |
| 8,306,555 B2 | 11/2012 | Morrison |
| 8,319,662 B1 | 11/2012 | Bontemps et al. |
| 8,350,721 B2 | 1/2013 | Carr |
| 8,393,750 B2 | 3/2013 | Clement |
| 8,398,284 B1 | 3/2013 | Dvorzsak |
| 8,405,498 B1 | 3/2013 | Smith et al. |
| 8,415,901 B2 | 4/2013 | Recker et al. |
| 8,423,048 B2 | 4/2013 | Morrison |
| 8,483,651 B1 | 7/2013 | Zamora et al. |
| 8,594,707 B2 | 11/2013 | Morrison |
| 8,599,039 B2 | 12/2013 | Otero et al. |
| 8,669,853 B1 | 3/2014 | Gardner |
| 8,738,025 B2 | 5/2014 | Hampel et al. |
| 8,842,021 B2 | 9/2014 | Behm et al. |
| 8,903,617 B2 | 12/2014 | Braunberger et al. |
| 8,947,219 B2 | 2/2015 | Popovic |
| 8,952,830 B2 | 2/2015 | Sims et al. |
| 9,111,447 B2 | 8/2015 | Holland |
| 9,224,294 B1 | 12/2015 | St. John |
| 9,333,913 B1 | 5/2016 | Elders et al. |
| 9,398,619 B1 | 7/2016 | Sennett et al. |
| 9,481,331 B1 | 11/2016 | Tucker et al. |
| 9,494,940 B1 | 11/2016 | Kentley |
| 9,616,810 B1 | 4/2017 | Tucker et al. |
| 9,643,533 B1 | 5/2017 | Houss |
| 9,679,487 B1 | 6/2017 | Hayward |
| 9,778,349 B2 | 10/2017 | Probert et al. |
| 9,792,817 B2 | 10/2017 | Rider et al. |
| 9,980,108 B2 | 5/2018 | Hepworth et al. |
| 9,986,401 B2 | 5/2018 | El Dinary |
| 10,055,985 B1 | 8/2018 | Hayward |
| 10,074,274 B2 | 9/2018 | Becker et al. |
| 10,124,757 B1 | 11/2018 | Kerr et al. |
| 10,127,813 B2 | 11/2018 | Walsh et al. |
| 10,147,247 B2 | 12/2018 | Nishida |
| 10,147,318 B2 | 12/2018 | Gebers |
| 10,171,980 B2 | 1/2019 | Friesen |
| 10,173,674 B2 | 1/2019 | Bidner |
| 10,194,484 B2 | 1/2019 | Lucero et al. |
| 10,204,517 B2 * | 2/2019 | Varoglu ............... H04B 17/318 |
| 10,217,357 B1 | 2/2019 | Elsheemy |
| 10,351,050 B1 | 7/2019 | Elwell |
| 10,386,195 B1 | 8/2019 | Grunberger et al. |
| 10,424,203 B2 | 9/2019 | Gunaratne |
| 10,598,332 B1 | 3/2020 | Elwell |
| 10,818,167 B2 | 10/2020 | Lu et al. |
| 10,891,858 B2 | 1/2021 | Walsh |
| 11,135,968 B2 | 10/2021 | Cobb et al. |
| 2002/0036908 A1 | 3/2002 | Pederson |
| 2002/0078879 A1 | 6/2002 | Wood |
| 2002/0105432 A1 | 8/2002 | Pederson et al. |

(56) References Cited

U.S. PATENT DOCUMENTS

| | | |
|---|---|---|
| 2003/0001728 A1 | 1/2003 | Flick |
| 2003/0132852 A1 | 7/2003 | Povey et al. |
| 2003/0141990 A1 | 7/2003 | Coon |
| 2004/0100373 A1 | 5/2004 | Ponziani |
| 2004/0257214 A1 | 12/2004 | Smithson |
| 2005/0072350 A1 | 4/2005 | Aasgaard |
| 2005/0099286 A1 | 5/2005 | DeYoung |
| 2005/0134448 A1 | 6/2005 | Perlman et al. |
| 2005/0239436 A1 | 10/2005 | Bell et al. |
| 2006/0022520 A1 | 2/2006 | Matheny |
| 2006/0043433 A1 | 3/2006 | Matsushita |
| 2006/0125616 A1 | 6/2006 | Song |
| 2006/0209547 A1 | 9/2006 | Biondo et al. |
| 2006/0273126 A1 | 12/2006 | Pedrini |
| 2007/0063824 A1 | 3/2007 | Gaddy et al. |
| 2007/0142977 A1 | 6/2007 | Munoz |
| 2007/0159319 A1 | 7/2007 | Maldonado |
| 2007/0159354 A1 | 7/2007 | Rosenberg |
| 2007/0194905 A1 | 8/2007 | Herrig et al. |
| 2008/0100432 A1 | 5/2008 | Hoffman |
| 2009/0045754 A1 | 2/2009 | Jozwik |
| 2009/0189754 A1 | 7/2009 | Hochrein |
| 2009/0219150 A1 | 9/2009 | Deyoung |
| 2009/0322508 A1 | 12/2009 | Malik |
| 2010/0109859 A1 | 5/2010 | Lakosky |
| 2010/0134271 A1 | 6/2010 | Edwards et al. |
| 2010/0159871 A1 | 6/2010 | Tester |
| 2010/0225465 A1 | 9/2010 | Ekchian et al. |
| 2010/0250111 A1 | 9/2010 | Gutierrez et al. |
| 2010/0253499 A1* | 10/2010 | Haab .................. H05B 47/18 340/471 |
| 2010/0267379 A1 | 10/2010 | Stahlin et al. |
| 2011/0063129 A1 | 3/2011 | Stahlin |
| 2011/0196566 A1 | 8/2011 | Slater |
| 2011/0205521 A1 | 8/2011 | Mimeault et al. |
| 2012/0043888 A1 | 2/2012 | Salter et al. |
| 2012/0176254 A1 | 7/2012 | Imanaga et al. |
| 2012/0185130 A1 | 7/2012 | Ekchian et al. |
| 2012/0268262 A1 | 10/2012 | Popovic |
| 2012/0310517 A1 | 12/2012 | van den Oever |
| 2012/0313792 A1 | 12/2012 | Behm et al. |
| 2013/0054087 A1 | 2/2013 | Mohamed |
| 2013/0093582 A1 | 4/2013 | Walsh et al. |
| 2013/0141251 A1 | 6/2013 | Sims et al. |
| 2013/0147955 A1 | 6/2013 | Oosugi |
| 2013/0190985 A1 | 7/2013 | Nakano et al. |
| 2013/0229289 A1 | 9/2013 | Bensoussan et al. |
| 2014/0055619 A1 | 2/2014 | Holland et al. |
| 2014/0085107 A1 | 3/2014 | Gutierrez |
| 2014/0146552 A1 | 5/2014 | Hui |
| 2014/0149025 A1 | 5/2014 | Fazi |
| 2014/0227991 A1 | 8/2014 | Breton et al. |
| 2014/0300462 A1 | 10/2014 | Russ |
| 2014/0301101 A1 | 10/2014 | Russ |
| 2014/0306826 A1 | 10/2014 | Ricci |
| 2014/0361686 A1 | 12/2014 | Wolfe |
| 2014/0368324 A1 | 12/2014 | Seifert |
| 2014/0375810 A1 | 12/2014 | Rodriguez |
| 2015/0061492 A1 | 3/2015 | Braunberger |
| 2015/0061895 A1 | 3/2015 | Ricci |
| 2015/0088397 A1 | 3/2015 | Burton |
| 2015/0116133 A1 | 4/2015 | Mawbey et al. |
| 2015/0127212 A1 | 5/2015 | Chacon et al. |
| 2015/0151671 A1 | 6/2015 | Refior et al. |
| 2015/0179066 A1* | 6/2015 | Rider .................... G08G 1/165 701/31.5 |
| 2015/0314723 A1 | 11/2015 | Ghiata et al. |
| 2016/0039336 A1 | 2/2016 | Nordstrom et al. |
| 2016/0039339 A1 | 2/2016 | Engel et al. |
| 2016/0144778 A1 | 5/2016 | Tucker et al. |
| 2016/0152176 A1 | 6/2016 | Kang |
| 2016/0210858 A1 | 7/2016 | Foster et al. |
| 2016/0257243 A1 | 9/2016 | Son et al. |
| 2016/0339837 A1 | 11/2016 | Bolduc et al. |
| 2016/0355123 A1 | 12/2016 | Oooka |
| 2017/0072835 A1 | 3/2017 | Shank et al. |
| 2017/0080850 A1 | 3/2017 | Drexler et al. |
| 2017/0124876 A1 | 5/2017 | Rogers |
| 2017/0243450 A1 | 8/2017 | Keller et al. |
| 2017/0246987 A1 | 8/2017 | Liljestrand |
| 2017/0259734 A1 | 9/2017 | Imaishi et al. |
| 2017/0274816 A1 | 9/2017 | Zhao |
| 2017/0274819 A1 | 9/2017 | Domingo |
| 2017/0305349 A1 | 10/2017 | Naboulsi |
| 2017/0352274 A1 | 12/2017 | Kodama et al. |
| 2017/0364070 A1 | 12/2017 | Oba |
| 2018/0056857 A1 | 3/2018 | Natale et al. |
| 2018/0061225 A1 | 3/2018 | Miglianico |
| 2018/0094777 A1 | 4/2018 | Vargas-Chambers |
| 2018/0281782 A1 | 10/2018 | Salter et al. |
| 2018/0304886 A1 | 10/2018 | Tannenbaum |
| 2019/0051156 A1 | 2/2019 | Banvait et al. |
| 2019/0080598 A1 | 3/2019 | Walsh et al. |
| 2019/0202476 A1* | 7/2019 | Tao .................... B60W 30/095 |
| 2019/0210515 A1 | 7/2019 | Aust |
| 2019/0234601 A1 | 8/2019 | Wescott |
| 2019/0248364 A1* | 8/2019 | Dastgir ................ B60W 10/04 |
| 2019/0279447 A1 | 9/2019 | Ricci |
| 2019/0283693 A1 | 9/2019 | Tucker et al. |
| 2019/0361453 A1 | 11/2019 | Kentley-Klay et al. |
| 2020/0094734 A1 | 3/2020 | King |
| 2020/0189446 A1 | 6/2020 | Tucker et al. |
| 2020/0189453 A1 | 6/2020 | Tucker et al. |
| 2020/0236745 A1 | 7/2020 | Garrett et al. |
| 2021/0056842 A1 | 2/2021 | Walsh et al. |
| 2021/0287543 A1* | 9/2021 | Karapantelakis ...... G08G 1/205 |
| 2022/0051340 A1 | 2/2022 | Rose et al. |
| 2023/0298465 A1 | 9/2023 | Walsh et al. |

FOREIGN PATENT DOCUMENTS

| | | | |
|---|---|---|---|
| CN | 107650778 A | 2/2018 | |
| CN | 110949241 A | 4/2020 | |
| CN | 111216624 A | 6/2020 | |
| DE | 19507433 A1 * | 6/1996 | ............ B60Q 1/441 |
| DE | 10218652 A1 | 11/2003 | |
| DE | 102009051837 A1 | 5/2011 | |
| DE | 102015205368 A1 | 9/2016 | |
| DE | 102015215766 A1 | 2/2017 | |
| DE | 202017100790 U1 | 3/2017 | |
| DE | 102017215865 A1 | 3/2019 | |
| DE | 102018128565 A1 | 5/2020 | |
| EP | 2827250 A2 | 1/2015 | |
| EP | 3178698 A1 | 6/2017 | |
| EP | 3287320 A1 | 2/2018 | |
| EP | 3702213 A1 | 9/2020 | |
| FR | 3056801 A1 | 3/2018 | |
| IN | 1702CHE2005 | 9/2007 | |
| JP | H00439939 U | 4/1992 | |
| JP | 2002274295 A | 9/2002 | |
| JP | 2003-205782 | 7/2003 | |
| JP | 2005170311 A | 6/2005 | |
| JP | 2006069245 | 3/2006 | |
| JP | 4485901 B2 | 4/2006 | |
| JP | 2006182172 A | 7/2006 | |
| JP | 2010152648 A | 7/2010 | |
| JP | 2013133071 A | 7/2013 | |
| JP | 2014500550 A | 1/2014 | |
| JP | 2014201298 A | 10/2014 | |
| JP | 2015009647 A | 1/2015 | |
| JP | 2015-44491 | 3/2015 | |
| JP | 2018536569 A | 12/2015 | |
| JP | 2016222171 A | 12/2016 | |
| JP | 2018020751 A | 2/2018 | |
| JP | 6561286 B1 | 8/2019 | |
| JP | 2019206225 A | 12/2019 | |
| JP | 2020090183 A | 6/2020 | |
| KR | 2019970032975 U | 7/1997 | |
| KR | 2019980031131 | 8/1998 | |
| KR | 1020030015908 | 2/2003 | |
| KR | 100656243 B1 | 12/2006 | |
| KR | 1020120048948 | 5/2012 | |
| KR | 1020120106036 | 9/2012 | |
| KR | 200484734 Y1 | 11/2017 | |

(56) References Cited

FOREIGN PATENT DOCUMENTS

| SI | 25623 A | 10/2019 |
|---|---|---|
| TW | 202022812 A | 6/2020 |
| TW | 202041101 A | 11/2020 |
| WO | 0100446 A1 | 1/2001 |
| WO | WO2002011100 A1 | 7/2001 |
| WO | 2004018256 A1 | 3/2004 |
| WO | 2008056186 A1 | 5/2008 |
| WO | WO2011154691 A1 | 12/2011 |
| WO | 2012071054 A2 | 5/2012 |
| WO | WO2016118575 A1 | 7/2016 |
| WO | 2018063253 A1 | 4/2018 |
| WO | 2020096060 A1 | 5/2020 |

OTHER PUBLICATIONS

"V2V Safety Technology Now Standard on Cadillace CTS Sedans video", , Publisher: https://media.chevrolet.com/media/ca/en/cadillac/bcportal.html/currentVideoId/5353289496001/pnId/0/typeId/c/currentChannelId/Most%20Recent.html.

Kelley Blue Book, "2017 Cadillac CTS Sedan Adds V2V Capability", Mar. 10, 2017, Publisher: https://www.kbb.com/car-news/2017-cadillac-cts-sedan-adds-v2v-capability/.

"99630 Strobe Power Module", , Publisher: http://www.grote.com/products/99630-alternating-x-pattern-led-strobe-amp-kit-strobe-power-module/.

"Amber Vehicle Car Truck Emergency Hazard Warning", , Publisher: www.amazon.com/Vehicle-Emergency-Hazard-Warning-Strobe/dp/B00MA7744G#productDetails.

"Brake Light Strobe Module", , Publisher: https://www.superbrightleds.com/moreinfo/strobe-controllers/brake-light-strobe-module/195/.

EPO, "EPO Search Report for EPO App. No. 16917956-1 dated May 13, 2020", "Extended European Search Report prepared for EPO Application No. 16917956.1 dated May 13, 2020", May 13, 2020, Publisher: European Patent Office.

Publisher: European Search Report dated Oct. 2, 2019 prepared for EPO Appl. No. EP19181421.

Jan. 12, 2018, Publisher: Extended European Search Report.

"ELFR-1 QD Electronic Led Flasher Relay With Quick Disconnects", , Publisher: www.customled.com/products/elfr-1-qd-electronic-led-flasher-relay.

"ELFR-P Programmable Electronic Led Flasher With OEM Connector", , Publisher: www.customled.com/products/elfr-p-led-flasher-relay.

"Flashing Brakes Lights Make a Difference—Look At The Facts", , Publisher: http://www.flashingbrakelights.com/.

"Flashing LED Brake Lights", , Publisher: http://www.ebay.com/bhp/flashing-led-brake-lights.

"How to Change Hazard Flashers to STrobe Flashers—Chevy Blazer Forums", , Publisher: http://blazerforum.com/forum/2nd-gen-s-series-1995-2005-tech-41/how-change-hazard-flashers-strobe-flashers-62080/.

"Intelligent Flashing LED Brake Lights (See How They Work)", , Publisher: http://safelightstore.com/.

"ELFR-1 Electronic Led Flasher Relay With OEM Connector", , Publisher: www.customled.com/products/elfr-1-electronic-led-flasher-relay.

"Motorcycle Run Brake Turn Conversion Kit", , Publisher: http://www.customdynamics.com/tailconversion_kit.htm.

Christianson et al, "Workzone Safety Improvements through Enhanced Warning Signal Devices", "https://escholarship.org/content/qt6nm2g4tg/qt6nm2g4tg.pdf", , Publisher: University of California, Berkeley 2008, Published in: US.

ISA/US, "International Search Report for PCT/US2016/054489", Dec. 29, 2016.

PCT/ISA/US, "PCT International Search Report for PCT/US2016/015125", Mar. 31, 2016.

"10 Car Options the Law Won't Let You Have: Strobe Brake Lights", , Publisher: http://www.popularmechanics.com/cars/news/industry/10-car-options-the-law-wont-let-you-have-4#slide-4.

"Vehicle Brake Light Flasher Module Safety Flash Light Alert", , Publisher: http://www.amazon.com/Vehicle-Flasher-Module-Safety-Universal/dp/B00FADDOL4.

International Search Report and Written Opinion Issued Nov. 23, 2020 in PCT/US2020/045930.

Diaz De Cerio et al, "Provisioning Vehicular Services and Communications Based on a Bluetooth Sensor Network Deployment", ISSN 1424-8220, May 29, 2015, pp. 12765-12781, vol. 15, Publisher: Sensors 2015.

Djajadi et al, "Inter-cars Safety Communication System Based on Android Smartphone", Oct. 26, 2014, Publisher: 2014 IEEE Conference on Open Systems (ICOS), Published in: Subang, Malaysia.

Al-Sultan, et al., "A comprehensive survey on vehicular Ad Hoc network", Journal of Network and Computer Applications, Jun. 20, 2012, pp. 380-392, vol. 37, Publisher: Elsevier Ltd.

Biswas, et al., "Vehicle-to-Vehicle Wireless Communication Protocols for Enhancing Highway Traffic Safety", IEEE Communications Magazine, 01/00/2006, pp. 74-82.

Boukerche, et al., "Vehicular Ad Hoc Networks: A New Challenge for Ad Hoc Networks: A New Challenge for", Science Direct, Jan. 7, 2008, pp. 2838-2849, vol. 31, Publisher: Elsevier B.V.

Braun, "Intelligent transportation systems: mirage or reality?", Microwave Journal, 08/00/1997, vol. 40.8, No. 22(9), Publisher: Horizon House Publications, Inc.

Buchenscheit, et al., "A VANET-based Emergency Vehicle Warning System", 00/00/2009, pp. 28-4-1-1-28-4-1-8.

Caballero-Gil, et al., "Design and Implementation of an Application for Deploying Vehicular Networks with Smartphones", International Journal of Distributed Sensor Networks, May 11, 2013, p. 10, vol. 2013, Publisher: Hindawi Publishing Corporation.

Calnan, "Jacksonville, Fla., Man's Device Would Warn Drivers about Emergency Vehicles", Dec. 5, 2003, Publisher: Tribune Content Agency LLC.

Chen, et al., "A Mobicast Routing Protocol in Vehicular Ad-Hoc Networks", 00/00/2009, Publisher: IEEE Globecom.

Cheung, et al., "R5_Vehicle to Infrastructure Technology Applications in Queensland", National Asset Centre of Excellence, 05/00/2014, pp. 1-88.

Djahel, et al., "Adaptive Traffic Management for Secure and Efficient Emergency Services in Smart Cities".

Ellery, "1,000 gadget that lets speeders spot police cars half a mile away: Device blasted by police as a possport to villainy", Dec. 13, 2014, Publisher: Daily Mail.com.

Harding, et al., "Vehicle-to-Vehicle Communications: Readiness of V2V Technology for Application", Report No. DOT HS 812 014, 08/00/2014, pp. 1-327, Publisher: Washington, DC: National Highway Traffic Safety Administration.

Miller, "Alert system is one cool tool", The Intelligencer, Oct. 1, 2011, Publisher: Postmedia Network Inc.

Kakkasageri, et al., "Information Managment In Vehicular Ad Hoc Networks: A Review", Journal ofNetwork and Computer Applications, 00/00/2014, pp. 334-350, vol. 39, Publisher: Elsevier Ltd.

Lee, et al., "Impact of Vehicular Networks on Emergency Medical Services in Urban Areas", International Journal of Environmental Research and Public Health, 11/00/2014, pp. 11348-70, vol. 11, No. 11.

Martinez, et al., "Emergency Services in Future Intellegent Transportation Systems Based on Vehicular Communication Networks", IEEE Intelligent Transportation Systems Magazine, 02/00/2010, pp. 6-20.

Nzouonta, "Road-Based Routing in Vehicular Ad Hoc Networks", New Jersey Institute of Technology—Department of Computer Sciences, 05/00/2009, pp. 1-164.

"Volvo Car Corporation Improves Safety with Communicating Cars", Oct. 22, 2012, Publisher: Targeted News Service.

Umedu, et al., "An Intervehicular-Communication Protocol for", IEEE Transactions on Vehicular Technology, 02/00/2010, pp. 627-637, vol. 59, No. 2.

Wang, et al., "A Multi-Agent Based Vehicles Re-routing System for Unexpected Traffic Congestion Avoidance", Oct. 8, 2014, pp. 2541-2548.

Wang, et al., "Design and Implementation of an Emergency Vehicle Signal Preemption System Based on Cooperative Vehicle-

(56) References Cited

OTHER PUBLICATIONS

Infrastructure Technology", Advances in Mechanical Engineering, Aug. 19, 2013, pp. 10, vol. 2013, No. 834976, Publisher: Hindawi Publishing Corporation.

Weinstein, "Device would take alarm out of sirens Two York men are working on a system that would alert drivers to ambulances", York Daily Record, Dec. 2, 1996, Publisher: Gannett Media Corp.

White, et al., "Wreck Watch: Automatic Traffic Accident Detection and Notification with Smartphones", Mobile Netw Appl, , pp. 285-303, No. 16.

IEEE Communications Surveys & Tutorials, 00/00/2009, pp. 1-20, vol. 11, No. 2.

Yang, et al., "A Vehicle-to-Vehicle Communication Protocol for Cooperative Collision Warning", IEEE Computer Society, 00/00/2004, pp. 1-10.

Xiaosi Zeng, "Potential Connected Vehicle Applications to Enhance Mobility, Safety, and Environmental Security", 02/00/2012, pp. 1-71, Publisher: Southwest Region University Transportation Center.

\* cited by examiner

SYSTEM FOR COMMUNICATION OF HAZARDOUS VEHICLE AND ROAD CONDITIONS

CROSS-REFERENCE TO RELATED CASES

This application claims the benefit of U.S. provisional patent application Ser. No. 62/885,659, filed on Aug. 12, 2019, and incorporates such provisional application by reference into this disclosure as if fully set out at this point.

FIELD OF THE INVENTION

This disclosure relates to communication of emergency conditions with respect to vehicles generally and, more specifically, to automated and electronic communication of emergencies, hazards, and other events between vehicles, or between vehicles and other receivers.

BACKGROUND OF THE INVENTION

Systems exist that provide enhanced visual communications systems for vehicles that are in distressed, breakdown, or emergency states. Enhanced visual communications systems may also be deployed when a vehicle has had an airbag activation or activation of traction control, ABS, or a similar automatic safety system. Enhanced visual communications systems may rely on increased flash rates (e.g., strobing) of vehicle signal lights or other lights that may include auxiliary lights or remote beacons. Various flashing patterns may be utilized in a manner designed to attract attention or communicate more effectively than with older slow speed standard hazard flasher systems. Examples of such enhanced visual communication systems relying utilizing vehicle signal lamps are described in U.S. Pat. No. 9,481,331 to Tucker et al. and U.S. Pat. No. 9,616,810 to Tucker et al.

Although enhanced visual communication systems relying only on strobing lights or other visual enhancements serve well to inform other drivers in proximity to the distressed vehicle that caution should be exercised, they are necessarily limited in their ability to inform drivers who may be too far away, behind other vehicles, around curves or bends in the road, or inhibited by other obstructions. Enhanced visual communication systems also still rely on at least some amount of attention being paid by other drivers, as well as their reaction time and ability to properly assess an emergency or distress visual communication, or to react appropriately.

Moreover, it would remain up to the individual driver to know how and when to deploy their own safety systems that may serve to mitigate the chance of further distress events (e.g., collisions) or to appropriately signal other traffic around them. It will occasionally be observed that a driver will activate his or her emergency flashers upon encountering another vehicle in distress or another emergency situation in order to pre-emptively alert drivers behind or near him or her. Although helpful, this is far from universal. Additionally, mere activation of hazard lights cannot provide information to drivers who are out of sight of the original event and do not know what is happening or how to respond. For example, in some cases it would be entirely appropriate to continue with increased caution (e.g., animals on the roadside), while in other cases the best response to an emergency would be to stop entirely (e.g., an overturned gasoline truck ahead).

Cars that are partially or completely self-driving are already a reality, and are predicted to become common place. Computer vision, radar, GPS and other technologies are deployed to make self-driving cars as aware of their surroundings as possible in order to safely drive on streets and highways. Statistically, self-driving cars may already be safer than human drivers. However, a self-driving car must still presently "see" or "hear" of a distress event of another car on the road in much the same manner as a human driver. They can "watch" for events that might be indicative of caution of distress, but they are limited by line of sight, other vehicles, obstructions, etc.

What is needed is a system and method for addressing the above and related concerns.

SUMMARY OF THE INVENTION

The invention of the present disclosure, in one aspect thereof, includes a system for signaling a hazard condition on a vehicle. The system has a microprocessor configured to receive an electronic signal from the vehicle that is indicative of a hazardous condition involving the vehicle, and a first radio transmitter in operative communication with the microprocessor. In response to receiving the signal indicative of a hazardous event, the microprocessor sends a first wireless signal via the first radio transmitter that indicates the vehicle is involved in the hazardous condition.

In some embodiments, the system includes or interfaces with a global positioning system unit that provides location data corresponding to the vehicle to the microprocessor and the first wireless signal includes the location data. A second radio transmitter may be in operative communication with a personal electronic device, the personal electronic device providing location data to the microprocessor that is included in the first wireless signal.

In some cases a radio receiver is also in operative communication with the microprocessor. The microprocessor may receive an indication of a hazard condition of another vehicle via the radio receiver and provides an indication of the same within the vehicle. The microprocessor may provide the indication of the hazard condition of another vehicle electronically to another system within the vehicle. The microprocessor may provide the indication of the hazard condition of another vehicle visually to an occupant of the vehicle. In some cases the microprocessor provides the indication of the hazard condition of another vehicle to a personal electronic device associated with an occupant of the vehicle. The system may include a a heads-up display such that the visual indication of the hazard condition of another vehicle is provided to an occupant of the vehicle using the heads-up display. The microprocessor may also provide the indication of the hazard condition of another vehicle audibly to an occupant of the vehicle.

Some embodiments have the microprocessor configured to detect an indication from another vehicle that the other vehicle in in a hazardous condition, and to transmit a second wireless signal via the first radio transmitter that indicates the other vehicle is in the hazardous condition. The indication from the other vehicle may be a line of sight communication or a visual indication from a forward-looking sensor communicatively coupled to the microprocessor. In some cases the forward-looking sensor comprises a camera.

The invention of the present disclosure, in another aspect thereof, comprises an emergency vehicle safety system having a microprocessor that receives notification of a hazardous condition involving the vehicle, a visual indicator visible from an exterior of the vehicle and operatively coupled to the microprocessor, a radio transmitter operatively coupled to the microprocessor. The microprocessor provides a high conspicuity visual signal on the visual indicator upon receipt of the notification of a hazardous condition involving the vehicle, provides a first radio communication via the radio transmitter upon receipt of the notification of a hazardous condition involving the vehicle.

In some embodiments the radio transmitter provides the first radio communication to a cellular phone tower. The radio transmitter may provide the first radio communication to a receiver of another vehicle or to a satellite system.

The visual indicator may comprises a set of lights operative as hazard flashers and turn indicator lights. The high conspicuity visual signal may comprises a signal having a flash rate in excess of a flash rate associated with the use of the set of lights as hazard flashers and in excess of a flash rate associated with the use of the set of lights as turn indicator lights. In some cases, the microprocessor does not provide the first radio signal via the radio transmitter when the visual indicator is used as hazard flashers or as turn indicators.

The microprocessor may receive notification of a hazardous condition involving the vehicle from a user operated switch inside the vehicle, from a vehicle safety subsystem, and/or from a personal electronic device. The microprocessor may receive location data for the vehicle from a global position system unit, and provide the location data in the first radio communication. In some cases, the global positioning system unit is provided, in part, by a personal electronic device.

The invention of the present disclosure, in another aspect thereof, comprises a system for providing real time indication of a hazardous vehicle condition. The system includes a server in communication with a first microprocessor of a first vehicle, the first microprocessor operative to receive a signal from the first vehicle indicating a hazardous condition. The server receives the indication of the hazardous condition from the first microprocessor and provides the indication to a second vehicle.

In some cases the second vehicle is equipped with a second microprocessor in communication with the server that receives the indication of the hazardous condition and provides an alert to an occupant of the second vehicle. The first microprocessor may be in communication with a global positioning system associated with the first vehicle and includes location data therefrom in the signal indicating a hazardous condition. The second vehicle may be equipped with a second microprocessor in communication with the server that receives the indication of the hazardous condition and provides an alert to an occupant of the second vehicle only when the first vehicle is located within a roadway path of the second vehicle.

The second vehicle may be equipped with a high conspicuity external visual indicator that is activated when the alert is provided. The second vehicle may be equipped with a second microprocessor in communication with the server that receives the indication of the hazardous condition and provides an alert to an occupant of the second vehicle only when the first vehicle is located within a threshold distance of the second vehicle. The alert may comprise a visual indication, possibly provided on a heads-up display. The alert may also comprise an audio alert.

The second vehicle may also be equipped with a high conspicuity external visual indicator that is activated when the alert is provided. The high conspicuity external visual indicator may be activated with the operator of the second vehicle decelerates as the second vehicle approaches the location of the first vehicle. The high conspicuity visual indicator may be activated as strobing lights at a rear of the second vehicle.

In another case, the second vehicle is equipped with a second microprocessor in communication with the server that receives the indication of the hazardous condition and provides an alert to an occupant of the second vehicle only when the first vehicle is located within a roadway path and within a threshold distance of the second vehicle. In some cases, the second microprocessor only provides the alert when the second vehicle is on a course to intercept the first vehicle. Again, the second vehicle may be equipped with a high conspicuity external visual indicator that is activated when the alert is provided.

DETAILED DESCRIPTION OF THE PREFERRED EMBODIMENTS

According to the present disclosure, various methods and systems are provided that enable vehicles to communicate with other vehicles, operators of those vehicles (whether human or computer), or others, such as emergency services, vehicle monitoring and control systems and the like, that a hazardous situation exists on the roadway. Systems of the present disclosure may also communication other information relating to the vehicle, other vehicles, or other conditions or information. In the case of communication to/from another vehicle, the systems may be referred to as vehicle-to-vehicle communication systems (e.g., V2V). However, communications may be sent or received from devices and systems apart from vehicles—for example, emergency services, traffic monitoring systems, streetlights, toll collection systems, and others. Such systems may be referred to as vehicle-to-everything or vehicle-to-environment systems (e.g., V2X).

It should be understood that the term vehicle, car, automobile and similar are intended to refer to any conveyance operating on a roadway. This includes, without limitation, cars, trucks, vans, SUVs, tractor/trailers, buses, and motorcycles, whether auto piloted or manually driven and whether carrying passengers, or goods, or being empty. It should also be understood that, for purposes of the present disclosure, a wireless signal or communication may be an intermittent or an ongoing/continuous signal or communication. It may represent an analog or digital communication. If digital, any one wireless communication or signal may comprise a number of smaller digital communications or signals that are broken down for transmission and reassembled by the receiver to complete the original communication or signal.

Figure 1:
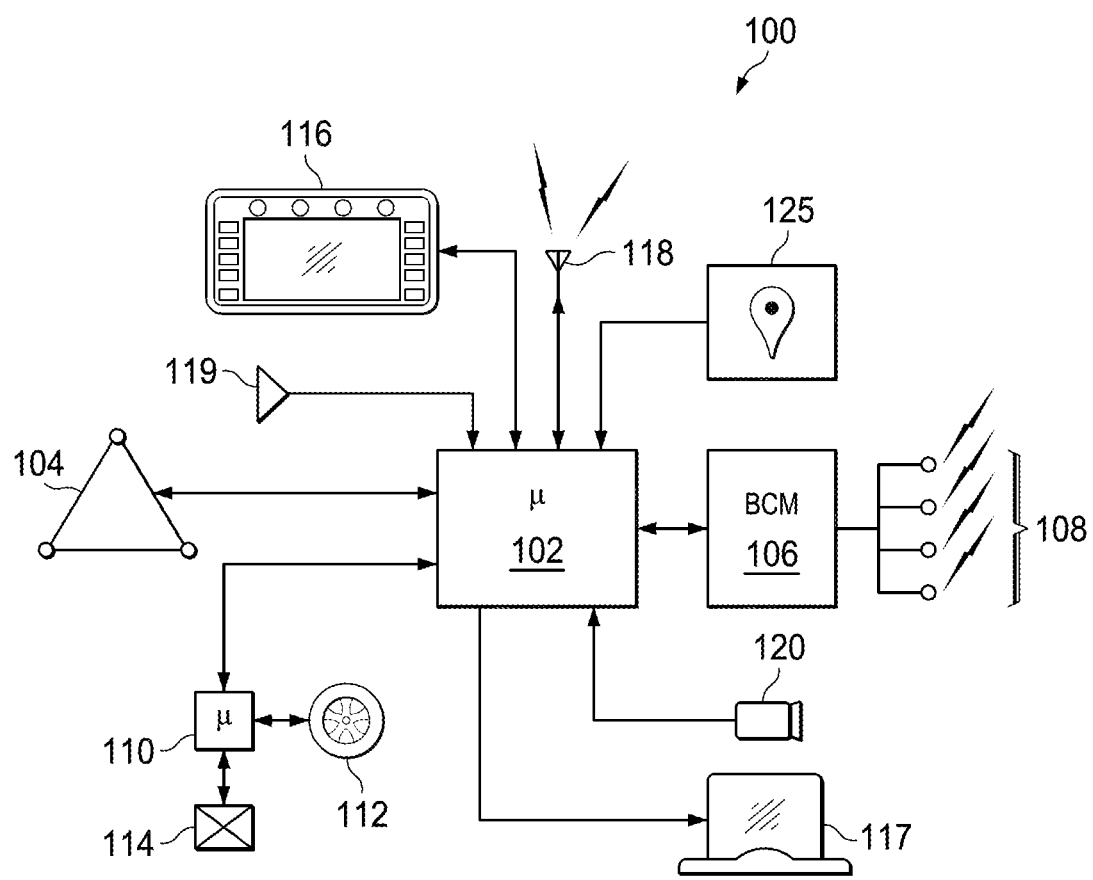
FIG. 1 is a schematic diagram of a vehicle emergency communication system according to aspects of the present disclosure.

FIG. 1 is an exemplary system according to the present disclosure. FIG. 1 illustrates a simplified schematic diagram of a system 100 that can deploy high conspicuity visual indicators on a vehicle while also communicating the presence of such a deployment to other vehicles or systems. It should be understood that systems of the present disclosure can relay the presence or activation of traditional hazard flasher lights as well as high conspicuity visual indicators— it is not necessarily dependent on the specific light or hazard/warning system actually deployed. For purposes of the present disclosure, a high conspicuity visual indicator is a lamp or light visible on the exterior of a vehicle that is differentiable from headlamps, marker lights, parking lights, brake lights, signal lights, or traditional hazard flashers based on a variable or increased flash rate, a variable or increased contrast, a variable or increased brightness, an altered or variable color, and/or a combination of these.

Traditional hazard flashers and signal lights that have been installed on vehicles for decades generally have a flash rate of up to about two cycles per second, or 2 Hz. This was originally owing in part to the incandescent type lighting and analog circuitry that was state of the art when these system were developed. This cycle rate has been carried into modern times until recently even where the vehicle lighting system is entirely controlled by a body control module (BCM) or other microcontroller. However, modern light emitting diodes (LEDs) as operated by microcontrollers, for example, are capable of a much wider range of operations in terms of cycle rate, intensity, and other parameters. For purposes of the present disclosure a hazard flasher is considered to be a lighting system operating according to a slow flash rate as would be supported by older incandescent bulbs and analog circuitry (e.g., around 2 Hz), even if the lighting system is actually LED and/or microcontroller based.

In some embodiments, the system 100 is microprocessor 102 based. It may have control routines encoded for execution on the microprocessor 102. In other embodiments "hard coded" silicone chips may be used that are not programmable or reprogrammable. In some embodiments, the microprocessor 102 may be considered a microcontroller and include its own memory, I/O controllers, A/D, D/A, etc. The microprocessor 102 (and the entire system 100) may be a standalone device installed as original equipment (e.g., at the time of a vehicle's manufacture), as dealer installed system, in the aftermarket by a third party, or in any other manner. The system 100 may also be a subcomponent of a larger, more comprehensive system (such as a vehicle safety suite).

The microprocessor 102 may be a component or subcomponent of a BCM installed when a vehicle is constructed. In some cases the functions of the microprocessor may be encapsulated as a BCM that is a component of a vehicle when first manufactured. In such cases, BCM 106 and microprocessor 102 as shown in FIG. 1 would be combined a single component with all illustrated connections (and possibly more). Although a BCM may typically be microprocessor/microcontroller based, application specific integrated circuits (ASICS), field programmable gate arrays (FPGAs) or other logic devices capable of implementing the required controls and routines may be utilized.

In one embodiment, the microprocessor 102 receives a signal from a hazard switch 104. This may be a user accessible hazard light switch used to a activate a hazard flasher or a high conspicuity lighting device. In other embodiments, the switch 104 is a dedicated or auxiliary switch used specifically to begin a vehicle to vehicle signaling routine. In some embodiments, the switch 104 is a "soft switch" activated on a vehicle multi-purpose display or menu system 116. As explained further herein, the switch 104 is merely one way to activate the system 100 for various functionality as described herein. In some embodiments, deployment may be automatic instead of, or in addition to, use of the switch 104. It should also be understood that the display 116 may comprise an OEM component of a vehicle, an aftermarket device, or a device associated with a personal electronic device. For purposes of the present disclosure, a personal electronic device may include a phone, tablet, laptop, or any other device that is not necessarily an integral component with the vehicle but can nevertheless provide effective communication to the vehicle via wired or wireless interface.

Voice activation provides an additional method by which the system 100 may be controlled. To that end a microphone 119 may be provided. The microphone 119 may be dedicated to the microprocessor 102 or may be a part of an existing system such as a hands-free navigation system or even a cell phone or other personal electronic device communicating by Bluetooth of otherwise. Thus, the system 100 is useful even if the user is not fully capable or is partially incapacitated. It is also known that certain vehicles today are capable by camera or other means to determine that a driver's focus has shifted from the appropriate task at hand (e.g., driving). Thus, the system 100 may be activated to signal a hazardous condition even if the driver does not explicitly do so, and even if the associated car has not yet deployed any other safety systems (e.g., traction control, airbags, etc.).

The microprocessor 102 may provide communication to an associated body control module ("BCM") to activate one or more sets of lights 108 associated with a vehicle in a flashing, strobing, or other communicative pattern. The lights 108 may comprise a set of OEM signal lamps. These may be used as hazard flashers, or as a high conspicuity visual indicators based on control by the microprocessor 102 and/or BCM 106.

It should be understood that, in some embodiments, the microcontroller 102 comprises the BCM 106 itself. In other words, it may replace a previously-known BCM or it may comprise functionality that is added to an existing BCM via hardware or software. It should be understood that such additions and modifications include both OEM and aftermarket configurations.

A vehicle may also be placed into a hazard or distressed mode via an automated vehicle system represented here by microcontroller 110. The microcontroller 110 may be a dedicated device or may be an ABS computer or sensor monitoring one or more wheels 112 for slippage, skidding, etc. It may also be a traction control computer. The microcontroller 110 may be an airbag controller or sensor for controlling one or more airbags 114. The microcontroller may also comprise an accelerometer. In some embodiments, the microcontroller 110 comprises the microprocessor 102 and/or the BCM 106. In further embodiments, one or more microcontrollers associated with a vehicle and/or systems of the present disclosure communicate via controller area network (CAN) bus or another network or protocol.

A forward-looking sensor (FLS) 120, such as a camera, radar, sonar, or other detection system, is illustrated as a component that may gather information from the roadway or other location associated with a vehicle. The FLS 120 may be a component of a vehicle safety or automation system such as an automated cruise control system, a driver awareness system, or a self-driving system, for example. In some embodiments, the FLS 120 may feed information directly to the microprocessor 102 for analysis. However, the FLS 120 may also feed into the BCM 106 or to the associated vehicle safety system (e.g., self-drive) that then provides information to the microprocessor 102. Such provided information may include, for example, that the vehicle has left the lane or roadway, that a collision has occurred or is imminent, that an animal or obstacle is in the road, that another vehicle is in the road, or that a hazard is otherwise present. The ability to recognize such dangers is now known in the art. In various embodiments, the present disclosure provides systems and methods for communicating such hazards onward to outside systems and to vehicles and drivers that may not otherwise perceive such dangers.

In operation, if any of the hazards discussed above, or others are indicated, or if skidding, vehicle traction control, ABS activation, air bag deployment, or any other safety related event is detected as having occurred by the microprocessor 110, this information may be relayed to microcontroller 102 and high conspicuity visual indicators activated. It should also be understood loss of tire pressure, loss of engine coolant, transmission overheating, low or empty fuel level, and other events may also be relied upon to place a vehicle into a distressed or hazard condition, resulting in high conspicuity visual indicators being activated. As illustrated, this may occur using lights 108. However, a separate beacon or auxiliary lights could also be used.

As a result of any kind of activation of a high conspicuity visual indicator, as performed by or otherwise indicated to the microprocessor 102, the system 100 may provide audible alerts to the driver that the system has been activated and what mode it is in. A speaker 119 may be provided, or audible cues may be provided through the vehicle audio system or another system. Similarly, visual cues may be provided via the display screen 116, illumination of the switch 104, a heads-up display 117, or by other mechanisms. Various systems may be capable of multiple modes of high conspicuity visual indication as well as traditional hazard modes. Thus, the particular high conspicuity visual indicator or hazard mode deployed may be accessible and even alterable by the user (e.g., via voice command, display panel 116, switch 104 or other gear).

In addition to providing indication or feedback to the user or driver of the vehicle, the system 100 may communicate the hazardous, distressed, or emergency condition to other vehicles or receivers electronically. The onward communication of the distress/hazard/emergency condition may occur automatically. In some embodiments, the user can initiate such communication or can prevent its communication outside the vehicle. For example, flashers (e.g., lights 108) may be activated for testing purposes or for visual effect not related to a true distress or emergency, and it may be desirable to repress such communication to avoid false signals being propagated to other vehicles.

An antenna 118 may be provided for outbound communication. The antenna may be dedicated to use by the system 100 or may be a diversity antenna capable of more than one use. The antenna may be an OEM or after-market item. It should also be understood that more than one type of antenna may be employed. For example, as needed, the system 100 may include a wi-fi, antenna, a cellular network antenna, a Bluetooth antenna, or others.

The microprocessor 102 may have access to GPS data for use in providing data about the vehicle in which it is installed, or for purposes of mapping a received signal to the location of the vehicle in which it is installed. A GPS unit 125 is shown in communication with the microprocessor 102 for purposes of illustration. The GPS unit 125 may be dedicated for use by the system 100, a separate vehicle subsystem or component of a subsystem, or could even represent GPS data or an "app" from a user's or occupant's personal electronic device.

Communication of the emergency event may be a simple indication to anyone with an appropriate receiver that a vehicle in the area is under distress. However, additional useful information may also be communicated. Information that may be communicated via the system 100 includes, but is not limited to, the vehicle system that signaled the emergency (ABS, traction, airbag, manual activation, etc.), location of the vehicle (e.g., via GPS), speed, mechanical state of the vehicle (operational or not), orientation of the vehicle (overturned or otherwise), deployment of airbags, and apparent state of the driver (engaging with controls or otherwise). In some embodiments, it may be possible to communicate the number of occupants of the vehicle, seat belt status, and so forth if such information is available to the microprocessor 102 via cameras or other sensors. The system could use such data, and in particular GPS location data, to calculate when a vehicle equipped with the system that such vehicle is proceeding on an intercept course with the emergency condition and only notify operators of vehicles that are likely to encounter the vehicle that has signaled an emergency condition to minimize unnecessary warnings to vehicles nearby that are on non-intercept courses. In some embodiments, the notification to other system-equipment vehicles may be an audio or visual indication system either that is either incorporated into the system or via an interface to the vehicle entertainment system. In addition, if the vehicle is equipped with a heads-up display, a visual indication may be projected. Using GPS information, the system could also display the location of the vehicle in distress on a GPS map display in the vehicle.

In some embodiments, the system 100 may be able to receive communications wirelessly (via antenna 118 or another antenna) that may be related to an emergency or hazard status of another vehicle. Thus, the microprocessor 102 may have or be communicatively couple to both a transmitter and receiver. This allows the system 100 to inform the occupants that a vehicle nearby may be in a hazardous condition even if they cannot visually observe the vehicle (e.g. due to terrain, traffic, buildings, weather conditions etc.). This may also allow the vehicle to be informed that an EMS, fire, police, etc. vehicle is on the roadway such that the driver can take precautions or prepare to stop or yield. The system 100 may also allow greater information to be provided to police or emergency personnel (e.g., number of occupants) than to other vehicles nearby identified only as normal civilian traffic. Of course, privacy concerns may have to be taken into account with any such system.

Figure 2:
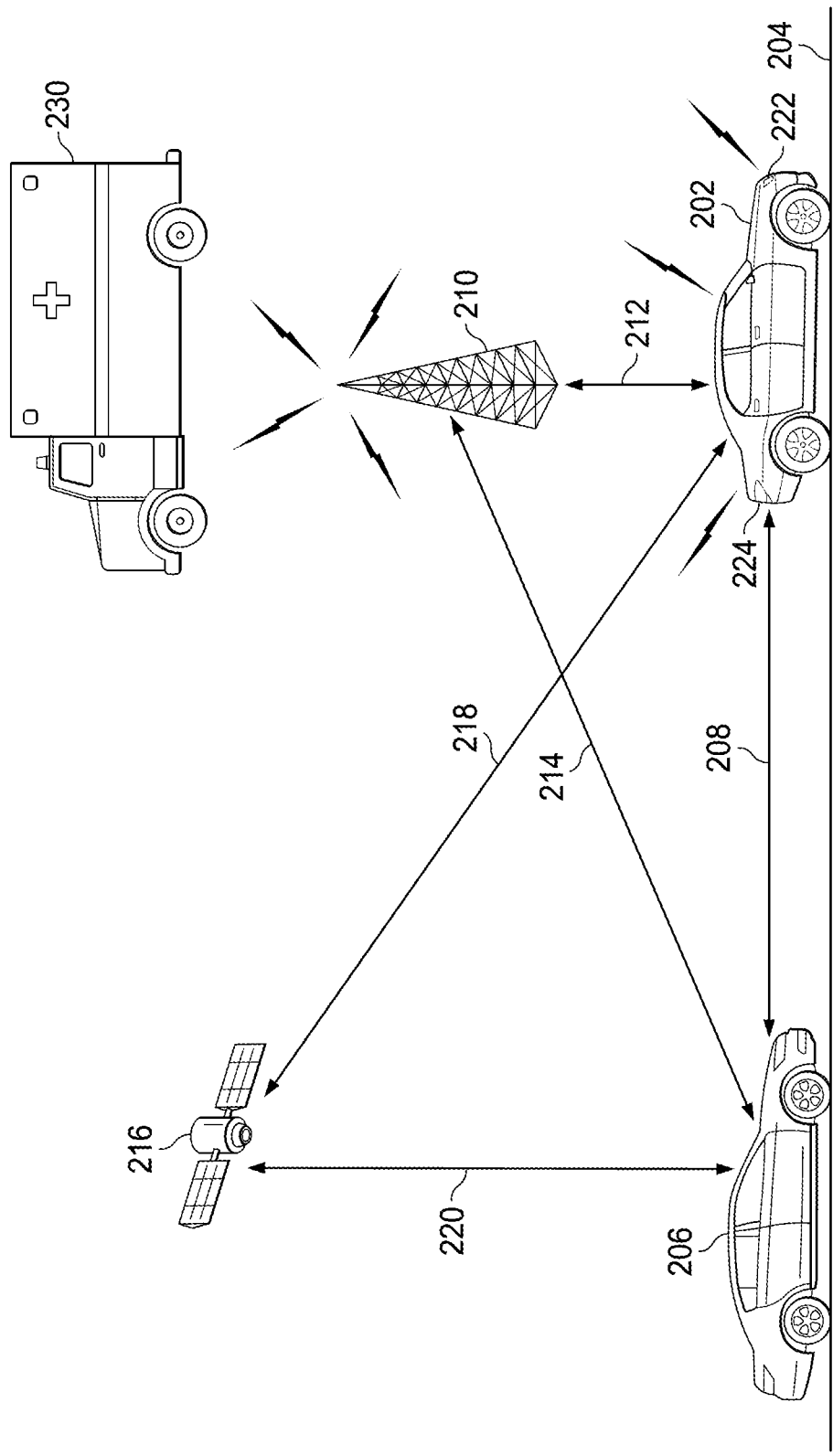
FIG. 2 is a communication link diagram of a one embodiment of vehicle emergency communication system according to aspects of the present disclosure.

With reference now to FIG. 2, various examples of mechanisms of communication between vehicles utilizing a system such as those of the present disclosure are shown. Here, a vehicle 202 is shown a distance apart on a roadway 204 from a second vehicle 206. It should be understood that the vehicles may be much further away than shown and that terrain, obstacles, and other cars may interpose the two exemplary vehicles shown. The vehicles 202/206 are also presumed to be equipped with a communicating hazard or safety system such as the system 100 or similar.

In the present example, vehicle 202 has encountered a hazard, breakdown, collision, or other event that has caused the vehicle to be placed in a state of hazard, emergency, or distress. A high conspicuity visual indicator may be deployed. In this case the high conspicuity visual indicator comprises front signal lights 222 and rear signal lights 224, and both may be strobing at a high rate, and/or providing a directional strobe (e.g., right to left). This may occur manually by the driver or another occupant, or automatically by one or more automatic vehicle systems. In other to provide advance warning to other drivers, or to summon emergency services, or for other reasons, the hazard state may be communicated wirelessly.

In the example shown, the vehicle 202 communicates the hazard condition to vehicle 206 thus allowing vehicle 206, either automatically or because of control by its driver, to be prepared for an emergency ahead that may not be visible from the car's 206 location. In some embodiments, radio communication 208 may occur directly, vehicle to vehicle. The signal communicated in this direct fashion could be a digital or analog signal occurring on a dedicated radio frequency set aside for such purpose. However, it may also occur via a network system having a built-out infrastructure such as, but not limited to, a mobile phone network or a satellite-based network.

It should be understood that more than one car may receive indication of the emergency from vehicle 202. For example, more than one vehicle may receive a locally broadcast signal. Additionally, in some embodiments, the vehicle 206 may automatically further relay the received information in a daisy-chain like fashion. In some embodiments, there may be a limit to the number of times or the distance that the emergency indication or hazard may be relayed. For example, there may be little or no benefit to relaying a message to a vehicle several miles up the road that may not encounter the hazard at all, or not within any reasonable time frame. The distance a receiving vehicle is from an originally transmitting vehicle may be based on available GPS data, cell tower data, or other information available to the microprocessor 102.

It is contemplated that the direct, wireless, vehicle-to-vehicle communication by systems of the present disclosure may take place by any known wireless radiofrequency protocol. It should also be understood that vehicle-to-vehicle communication may take place via visual light signaling (e.g., vehicle 206 monitoring for high frequency strobing of lights on vehicle 202, such as by camera 120), via infrared (with IR transceivers integrated with the associated vehicles) or via other light-based communication methods.

As illustrated, the vehicle 202 communicate the present hazard condition to a wireless phone or data network (e.g., cellular) represented here by tower 210 as shown by communication link 212. The network 210 may comprise a phone and data network such as a 3G/4G/5G or other network. Systems and methods of the present disclosure are intended for operation with any known network. The network 210 may communicate the emergency or hazard to other vehicles in the area as shown by link 214. Here again, not every vehicle in the area is necessarily impacted by the particular hazard being encountered by vehicle 202. Systems on-board the alerted vehicles may discriminate between hazards affecting or not affecting the alerted vehicle based on location and type of emergency (if provided). For example, a hazard on an adjacent street would not necessarily cause an alarm or any other action on a vehicle receiving indication of the hazard from network 210.

In another embodiment, the presence of the hazard may be relayed to relevant vehicles and other devices via a satellite network 216. In such case, the vehicle 202 may convey the emergency or hazard and the associated relevant data to satellite network 216. Such information may be relayed then to vehicle 206 or other vehicles by the network 216. It should be understood that the satellite network 215 may provide more than a single satellite. Systems and methods of the present disclosure are not intended to be limited to any particular satellite system implementation.

In addition to other vehicles, such as vehicle 206, hazards may be communicated to emergency services 230. This may be via any of the methods discussed herein. Emergency services may include, but is not limited to, fire, police, ambulance, and road-side assistance services. If the information provided by the vehicle signaling the hazard is sufficiently detailed, time may be saved by dispatching the most relevant service to the distressed vehicle. For example, if the hazard or distress is only the result of a mechanical breakdown, roadside assistance and perhaps police may be signaled, but EMS or fire might not.

Figure 3:
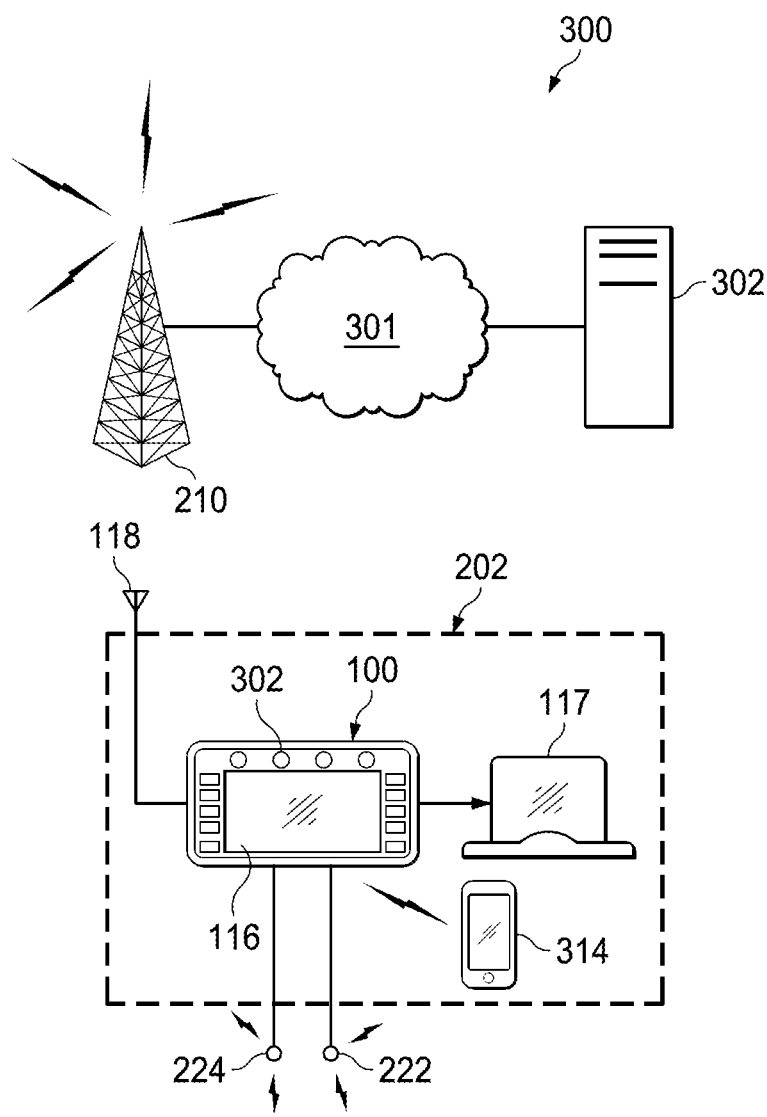
FIG. 3 is communication link diagram of another embodiment of an emergency communication system link diagram according to aspects of the present disclosure.

Referring now to FIG. 3 a communication link diagram of another embodiment of an emergency communication system 300 according to aspects of the present disclosure. The system 300 shares the vehicle installed components with the system 100, but not all are shown for purposes of clarity. Here, a particular vehicle 202 is shown as a logical boundary line. The high conspicuity visual indicators 222/224 are shown outside the boundary of the vehicle 202 to denote that they are visible outside the vehicle 202 (e.g., front and rear). The internal components of the system 100 are illustrated within the vehicle 202 with display screen 116 and option switchgear 302 being visible. If a heads-up display 117 is provided as original equipment or an aftermarket add-on, it may be communicative coupled to the system 100 for receiving and displaying warnings, messages, or other information. The antenna 118 is also shown external to vehicle 202 but it may actually be within the confines of the vehicle so long as it is able to establish a communication link with network 210. Only a single vehicle 202 is shown schematically for clarity, but it should be understood that multiple vehicles may be equipped with the system 100 or similar such that they are able to participate in issuing and receiving warnings as described herein.

The network 210 may send and receive communications to and from the vehicle 202 and other vehicles as previously described. Here, however, the network 210 sends data via the internet 301, using TCP/IP or another suitable protocol. Data may be encrypted or otherwise protected as is known in the art. Data from the vehicle 202 is ultimately provided to a data server 302. The server 302 may track vehicles based upon GPS location or other data. Thus the server 302 may then discriminate as to which other vehicles any received hazard or emergency condition notification should be relayed to. The server 302 may also be connected to request EMS or other services automatically. GPS and other known data can be provided by the server 302 to the relevant services aid in faster response times. It should be understood that the server 302 may be any device capable of fulfilling the role of processing, analyzing, prioritizing, and distributing indications of hazard conditions and location data using software methods as are known in the art. The server 302 may comprise multiple redundant servers and may comprise a cloud-based services as known in the art.

Also shown in FIG. 3 is an example of a personal electronic device, a phone 314, in communication with the system 100. Communications can occur via Bluetooth or another wireless protocol, or via a tethered/wired connection. In some cases, the phone 314 may provide interaction with the system 100 possibly providing occupant/user data and/or GPS information. The system 100 may be partially or completely controllable via the phone 100 via an app or another suitable interface. The system 100 may also be operable to interface with a phone 314 via well-known protocols such as Apple CarPlay®, Android Auto®, or others.

Figure 4:
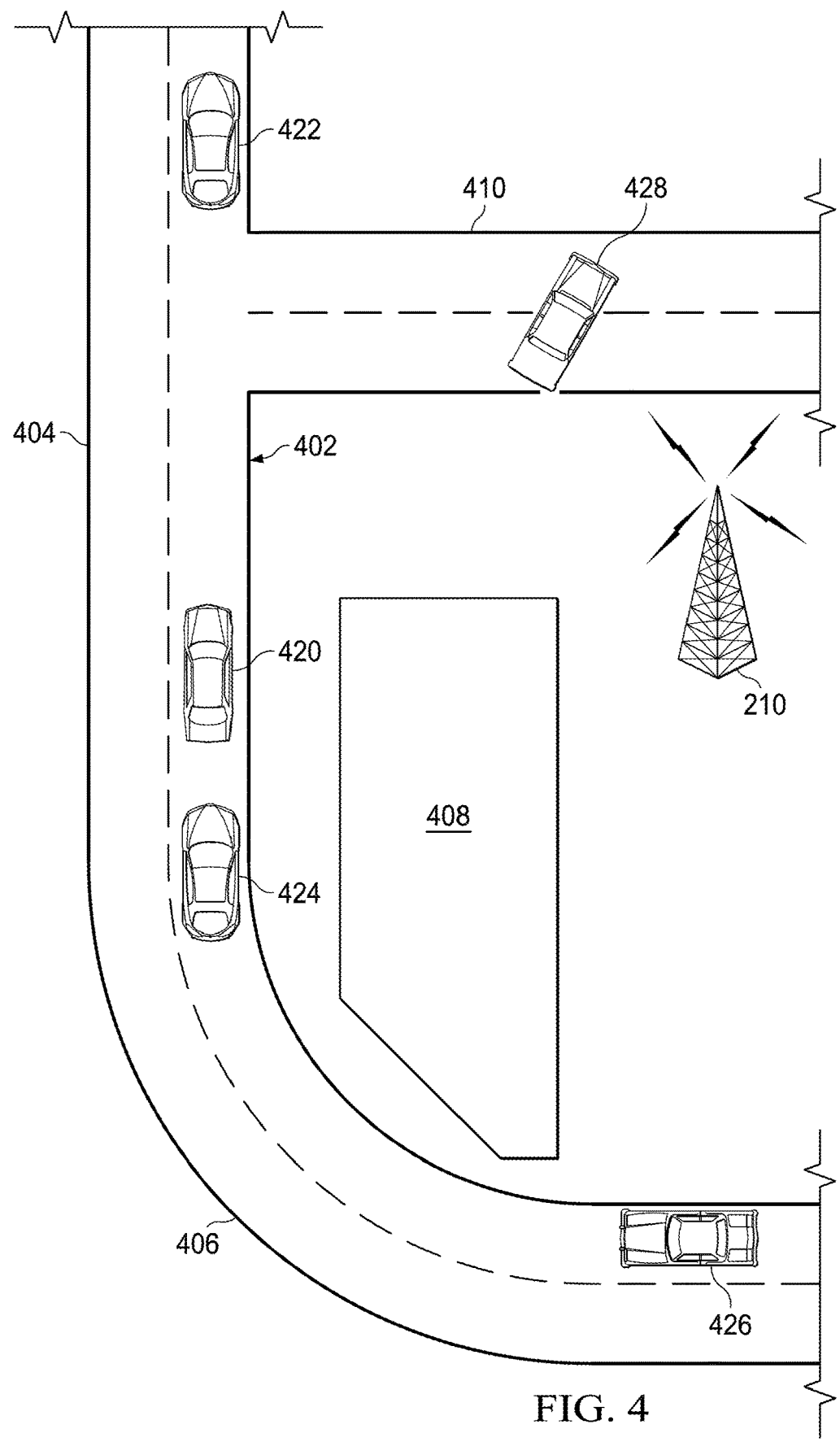
FIG. 4 is a diagram illustrating potential relationships between driving and disabled vehicles on a road network

Referring now to FIG. 4, a diagram 400 illustrating potential relationships between driving and disabled vehicles on a road network is shown. Diagram 400 is intended to illustrate at least some of the functionality of devices and systems according to the present disclosure as deployed in realistic scenarios. A roadway 402 is shown having a straight section 404 joining a curved section 406. Where the straight section 404 joins the curved section 406 a clear view of the roadway 402 is blocked by a building 408 (but this could be any other obstacle including trees, terrain, guardrails, or even limited visibility due to weather conditions). A side road 410 is also shown joining the roadway 402 on the straight section 404. Various vehicles 420, 422, 424, 426 are shown at various locations for illustrative purposes.

In a basic example, if vehicle 422 has encountered a hazardous condition (such as, but not limited to, any of the examples provided above) and it is equipped with a system according to the present disclosure (e.g., system 100) it may deploy a high conspicuity visual indicator (manually or automatically) resulting in a wireless signal being sent indicating the hazard. Presuming vehicle 420 is properly equipped, it may receive the signal (directly or from the network 210) and thus be alerted, perhaps long before the hazard is perceived by the driver. If the vehicle 420 has cruise control activated, it may be cancelled, braking may be activated, or any number of preliminary measures based on automated vehicle control systems.

If the vehicle 424 is also properly equipped, the hazard indication may be communicated to it as well (from vehicle 420 or network 210). Thus even though vehicle 424 may have limited visibility down the road because of vehicle 420, and may otherwise have no indication of any hazard apart from slowing or evasion of vehicle 420, it can now be alerted and the driver or an auto drive system can take appropriate precautions. Any automatic steps taken, or the level of warning provided to a human driver (e.g., louder alarms, visible flashing lights, etc), can be increased based on the proximity of either vehicle 420, 424 to the disabled or hazard-stricken vehicle 422 depending on proximity, speed, road condition, or other factors.

In some situations, a vehicle receiving an indication of a hazard condition from a nearby vehicle may automatically deploy its own high conspicuity visual indicators. For example, once vehicle 420 or 424 are near enough the hazard-stricken vehicle 422 not to provide a false signal where it is not needed, they may deploy their own high conspicuity visual indicators in the interest of providing warning to vehicles that are not equipped with systems according to the present disclosure.

In another example, if vehicle 420 were disabled in the roadway, vehicle 424 may deploy its own high conspicuity visual indicators upon encountering the vehicle 420 and automatically send a signal indicative of a hazard condition to network 210 and/or via local broadcast since it is in a highly dangerous situation owning the limited view around building 408. Such action may be taken by a system 100, for example, deployed in vehicle 424, even if the driver does not react. The microprocessor 102 may be informed based on GPS data, camera data, or other data that the vehicle 424 has become stopped in a roadway and it is not the result of a traffic jam or other relatively benign condition. Approaching vehicle 426 may therefore be alerted based on its own system (e.g., system 100) and if it is not so equipped, the driver will at least have an improved chance at reacting in a timely and appropriate manner based on the increased conspicuity of vehicle 424.

In another example, vehicle 428 is wrecked on side street 410 and occupies two lanes of traffic. If the vehicle 428 is so equipped, (e.g., with a system such as 100) it may automatically deploy high conspicuity visual indicators and a communication of its situation and GPS location locally, by direct broadcast, and/or via network 210. Although vehicle 420 may be passing very near the disabled vehicle 428, its own high conspicuity systems may not deploy as its own microprocessor 102 can compute that, based on GPS data, vehicle 420 will not necessarily encounter vehicle 428 at all. Thus, the signal corresponding to disabled vehicle 428 may not be improperly propagated potentially causing slow-downs or pile on collisions from vehicles 424, 426.

It should be understood that these examples are illustrative only, and that systems and methods of the present disclosure may have many other modes of operation and many other capabilities. It should also be understood that, in addition to direct, vehicle-to-vehicle communication and communication via network 210, that the illustrated vehicles may communicate via satellite and/or a server-based system (e.g., 300) or a combination of these.

Figure 5:
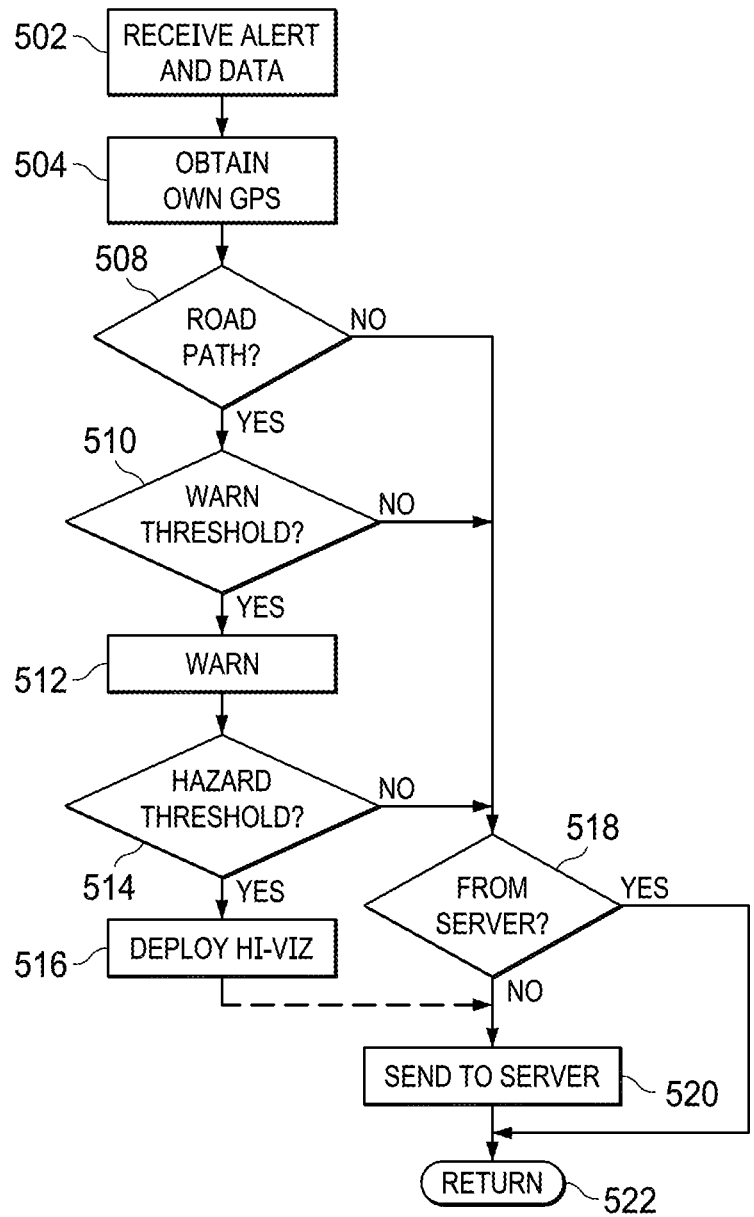
FIG. 5 is a flow chart corresponding to one method of operation of an emergency vehicle communication system according to aspects of the present disclosure.

Referring now to FIG. 5, a flow chart 500 corresponding to one method of operation of an emergency vehicle communication system according to aspects of the present disclosure is shown. The chart 500 illustrates a potential flow of operations when a system according to the present disclosure (e.g., 100, 300) receives notification that another vehicle has encountered a hazardous condition. At step 502 the system 100 receives the hazard/emergency notification. In the present example, the system receives GPS coordinates from the original broadcasting data. At step 504 the system obtains its own GPS location data (e.g., from GPS unit 125). At step 508 the microprocessor may determine whether the GPS location of the broadcasting vehicle represents a location that is on its own road pathway. For purposes of this disclosure a road pathway would be the roadway the receiving vehicle is travelling on, considering the direction, or on a side road, turn, exit, etc. that the vehicle is likely to take.

If yes (the broadcasting vehicle is on the receiving vehicle's road pathway), the system may additionally determine if the broadcasting vehicle is within a threshold that requires warning the driver or vehicle immediately at step 510. This determination may be based on speed limit, actual vehicle speed, time or day, road conditions, etc. For example, warning a driver of a received hazard broadcast from another vehicle with the receiving vehicle is already stopped, is parked, or on an adjacent roadway may not be helpful. However, a low threshold waning could still be given (a non-emergency cautionary indication inside the car, for example).

If the broadcasting vehicle is within the threshold, an appropriate may be provided alert at step 512. This may be both to the driver of the vehicle and to the vehicle itself (e.g., via CAN bus, or other connection). The alert may be used by auto control systems of the vehicle to stop cruise control or take other precautionary actions, or by self-driving systems to prepare to stop, reroute, etc.

A second threshold may be checked at step 514 to determine if the receiving vehicle itself is now in a hazardous state. This may be based on position in the roadway from GPS, camera, or other data, general conditions, proximity to the broadcasting vehicle and other factors. At step 514, if the system 100 determines it is warranted, the receiving vehicle may activate its own high conspicuity visual display systems.

If the broadcasting vehicle is not on the receiving vehicle's road pathway (step 508), and is not within the warning threshold (step 510) or hazard threshold (step 514) the system may nevertheless determine at step 518 if the broadcast warning was received from its own connected server (e.g., sever 302). If not (e.g., the signal was received only directly from the broadcasting vehicle, wirelessly, via light sensors, etc.) the system may forward the hazardous condition alert to its own server at step 520. Thus, the broadcast event becomes available to other vehicles interfaced with server 302. If the system deploys its own high conspicuity visual display system, it may also report this to the server at step 302 as this is indicative the originally broadcast hazard condition may have expanded or propagated.

It is to be understood that the terms "including", "comprising", and grammatical variants thereof do not preclude the addition of one or more components, features, steps, or integers or groups thereof and that the terms are to be construed as specifying components, features, steps or integers. It should also be understood that the illustrated and describe embodiments may have additional components that are not shown and are not intended to be excluded by their absence. However, other embodiments contain only those components explicitly references and other components and functions are therefore excluded. Not all components and steps that would easily be grasped and understood to be present by one of skill in the art are necessarily explicitly described or illustrated.

An operative connection, a communicative coupling, and similar terms indicate that appropriate structure may be present to provide the stated function.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for providing real time indication of a hazardous vehicle condition comprising:
   a server in communication with a first microprocessor of a first vehicle, the first microprocessor operative to receive a first communication sent from the first vehicle to the server indicating the first vehicle is in a hazardous condition and a location of the first vehicle;
   wherein the server receives a second communication sent from a second vehicle to the server indicative of a location of the second vehicle; and
   wherein the server provides a third communication to the second vehicle when it is determined that the locations of the first and second vehicle lie on a common roadway path and within a predetermined distance of one another.

2. The system of claim 1, wherein the second vehicle is equipped with a second microprocessor in communication with the server that provides an alert to an occupant of the second vehicle upon receipt of the third communication.

3. The system of claim 1, wherein the first microprocessor is in communication with a global positioning system associated with the first vehicle to determine the location of the first vehicle.

4. The system of claim 1, wherein the alert to the occupant of the second vehicle is a visual indication.

5. The system of claim 4 wherein the visual indication is provided on a heads-up display.

6. The system of claim 1, wherein the alert to the occupant of the second vehicle is an audio alert.

7. The system of claim 1, wherein the second vehicle is equipped with a high conspicuity external visual indicator that is activated when the alert is provided.

8. The system of claim 7, wherein the high conspicuity external visual indicator is activated to strobe the lights at the rear of the second vehicle.

* * * * *